3,767,809
METHOD OF CONTROLLING THE GASTROPOD VECTORS OF PARASITIC FLUKES

Nathan F. Cardarelli, Copley, Ohio, assignor to Diamond Shamrock Corporation, Cleveland, Ohio
No Drawing. Filed Oct. 26, 1971, Ser. No. 192,577
Int. Cl. A01n 9/20
U.S. Cl. 424—304    12 Claims

ABSTRACT OF THE DISCLOSURE

Gastropod vectors of parasitic flukes are controlled by exposing such gastropods or their eggs to an amount of tetrachloroisophthalonitrile sufficient either to kill the gastropods or to prevent the eggs of the gastropods from hatching.

BACKGROUND OF THE INVENTION

This invention relates generally to the chemical control or eradication of the gastropod vectors (intermediate snail hosts) of parasitic flukes that infect man and animals and in particular to the control of the gastropod vectors of blood flukes or schistosomes that find their way into and lodge in the body of man and cause the debilitating and eventually pathogenic disease known as schistosomiasis or bilharziasis.

Schistosomiasis afflicts an estimated two to three hundred million human beings in the tropical and subtropical regions of the world and causes about six million deaths per year, thus making it one of the major scourges of mankind. The principal causes of schistosomiasis are *Schistosoma htematobium, S. mansoni* and *S. japonicum*, the three major species of parasitic flatworms, commonly referred to as schistosomes, that lodge and propagate in the circulatory system of man wherein they can live for up to 7 years causing, principally because of the egg masses laid therein, blockage and inflamation of the blood vessels which in turn gives rise to degeneration of tissue, infection, and damage to vital organs.

The schistisome gains entrance into man via a free swimming, fork-tailed, second larva-form of the schistosome, called cercaria, that are capable of penetrating the skin or mucous membrane and commonly infest fresh water sources to which man is exposed. The cercariae are propagated from schistosome eggs excreted by man that find their way into the fresh water sources where they hatch to form a first larva stage, called miracidia, that attack and infect certain species of snails (class Gastropoda) where the second larva stage cercariae are formed. Thus such snails are the intermediate hosts in the life cycle of the schistosome parasite. While there is not yet unanimity with respect to the species of gastropods that act as carriers or vectors for schistosomes and hence the disease schistosomiasis, the species and the endemic areas of many have been identified, as shown in the compilation on pages 14 and 15 of the monograph entitled "Snail Control in the Prevention of Bilharziasis" published in 1965 by the World Health Organization.

While schistosomiasis may be combatted and controlled by medication of afflicted individuals, or provision of clean water supplies through improved sanitation and hygiene, these methods are difficult and often impractical to achieve and hence are generally ineffective. Thus the main emphasis on schistosomiasis control has been directed to controlling and if possible, eradicating the snail intermediate host in water sources to which man is exposed. In this approach, the chemical control of the intermediate-host snail by the use of compounds, called gastropodicides, capable of killing either the immature or mature snail, or the use of compounds, called ovicides, that kill or prevent the hatching of the snail eggs has been one the principal means employed. Additionally, some of these gastropodicides prevent schistosomiasis because they are cercaricidal, killing the schistosome cercariae at the concentrations used to kill the snails.

Illustrative of the principal gastropodicides that are presently used are copper sulfate, sodium pentachloraphenate, copper pentachlorophenate, the ethanolamine salt of 5,2'-dichloro 4'-nitrosalicylanilide, N-trityl morpholine and tributyltin acetate. While generally effective in varying degrees as gastropodicides, when properly used, all exhibit one or more of the following deficiencies; nonovicidal, noncercaricidal, corrosive, unstable in storage, degrades when exposed to sunlight, reduced effectiveness in hard water or water having high acidity or alkalinity, toxicity to other aquatic life, or high mammalian oral or dermal toxictiy.

SUMMARY OF THE INVENTION

Considering these deficiencies of presently known and used gastropodicides, it is a general object of this invention to provide a method of controlling and eradicating the gastropod vectors of parasitic flukes and in particular schistosomes by employing as the gastropodicide a particular halogenated isophthalonitrile that is either free of, or exhibits to a significantly reduced extent, the drawbacks of the present gastropodicides known to the art.

Specifically, it is an object of this invention to provide a gastropodicide that: is not only toxic to the immature or mature form of the snails, but also kills snail eggs and schistosome cercariae at extremely low subgastropodicial concentrations; is inert and hence stable in storage and noncorrosive to containers and apparatus used to store and spread the gastropodicide; is essentially unaffected by the aquatic habitat in which it is used thus providing long-lasting effectiveness; is noninjurious to other aquatic life at gastropodicial concentrations; and exhibits a low order of mammalian oral and dermal toxicity.

It has been found that these objects and other desirable advantages, hereinafter described, can be obtained by employing tetrachloroisophthalonitrile as the -principal active ingredient in gastropodicidal compositions used for the chemical control and eradication of the gastropod vectors of parasitic flukes causing disease in man and animals and particularly the gastropod vectors of schistosomiasis.

It was surprising and highly unexpected that tetrachloroisophthlonitrile should function so effectively as a gastropodicide for the eradication of the fresh-water snails that are responsible for transmitting either schistosomiasis to man or other parasitic fluke diseases to man or animals based on the teaching of the prior art, of which applicant is aware, regarding its toxicant properties. For instance, U.S. Pat. 3,331,735 discloses only that tetrachloroisophthlonitrile effectively controls fungus, bacteria and nematodes. Japanese patent application 31,541/66, now Japanese Pat. 584,922, on the other hand, teaches that tetrachloroisophthalonitrile, when incorporated into conventional coating vehicles such as alkyds, epoxies, vinyl polymers and the like, inhibits the growth of marine organisms on surfaces protected with such coatings. It is the general consensus that antifouling chemicals prevent marine animal fouling of coated surfaces by repelling the animals rather than killing them. Finally, in Circular 199 of the U.S. Department of Interior, directed to pesticide and wildlife studies and dated 1963, it is reported that small oysters exposed for 96 hours to 1 p.p.m. of tetrachloroisophthalonitrile in 25% saline sea water at 14° C., while exhibiting retarded growth, had only a 42% mortality during a recovery period exceeding six weeks.

DESCRIPTION OF THE PREFERRED EMBODIMENTS

In the practice of the method of this invention, the tetrachloroisophthalonitrile is applied to the aquatic habitat of the snails in a physical form and in a concentration that will affect the desired killing of the snails or their eggs.

Since tetrachloroisophthalonitrile is only soluble in water to the extent of about 0.5 p.p.m., maximum killing efficiency dictates that it be comminuted. Usually, effective gastropodicidal activity is obtained when the tetrachloroisophthalonitrile has an average particle size of about 5 microns or less with an average particle size of about 2 microns or less being preferred for maximum efficacy.

The quantity of tetrachloroisophthalonitrile required for every situation can not be delineated with exactness because, as is known to those skilled in the art, it is related to a number of interrelated factors that vary, as for example: the specie, age and hardiness of the snail; the desired quickness of kill; the temperature, pH, mineral content, and extent of flow of the water habitat; the quantity of aquatic vegation present, and so forth. In laboratory evalutions of the effectiveness of tetrachloroisophthalonitrile against laboratory cultured *Biomphalaria glabrata*, employing the procedure described in the article "Molluscicide Screening and Evaluation" appearing in the Bulletin World Health Organization 1965, 33, 567–581, the following lethal concentrations ($LD_{90}$-hr.) were observed; adult snail, 16 to 18 p.p.m., young snails, 3.6 to 4.0 p.p.m. Further, it was observed that eggs of this snail specie, when exposed to concentrations of the toxicant as low as 0.07 p.p.m. failed to hatch after 18 days. Since such eggs normally hatch within 8 to 10 days, this indicates that tetrachloroisophthalonitrile was ovicidal at this concentration. Based on these results, it is believed that even lower concentrations would be ovicidal.

Additionally, other laboratory evaluations established that tetrachloroisophthalonitrile at a concentration of 0.07 p.p.m. killed the cercariae of *Schistosoma mansoni* within 45 minutes. More rapid kills could be achieved by increasing the concentration of the compound. The cerceria of other schistisome species, likewise, would be expected to be killed by tetrachloroisophthalonitrile.

In these tests the schistosome snail vector, *Biomphalaria glabratus*, was chosen because it is considered to be one of the most difficult species of aquatic snails to eradicate by chemical means—being on the whole, more resistant to presently used gastropodicides than the majority of other aquatic schistosome snail vectors of principal concern to public health organizations. Based on experience with these other gastropodicides, it is expected that, usually, tetrachloroisophthalonitrile will be gastropodicidal against other aquatic schistosome snail vectors at lower concentrations than the lethal concentrations required for *Biomphalaria glabratus*.

In these laboratory tests an aqueous dispersion of the tetrachloroisophthalonitrile comminuted to an average particle size of about 2 microns maximum, and dispersed with a conventional nonionic surfactant was employed.

In field applications of tetrachloroisophthalonitrile to eradicate the eggs or the immature or mature forms of the schistosome carrying snail and concomitantly any schistosome cercariae that may also be present, the tetrachloroisophthalonitrile gastropodicide compositions may be applied to the aquatic habitat of the snail in the form of; an aqueous dispersion such as employed in the laboratory tests, an emulsifiable solution, a wettable powder, or water-soluble or water leachable pellets. As known to those skilled in the art, all of these forms of gastropodicide compositions may contain one or more of the following kinds of adjuvants: surfactants to promote the dispersion, wettability, or emulsification of the gastropodicide composition; defoamers; colloidal stabilizers; thickening agents; solvents; liquid or solid diluting carriers or water-soluble or water-swellable binders. The prior art is replete with examples of these adjuvants, as for example, the disclosures contained in U.S. Pats. 3,079,297, 3,168,437, 3,331,735 and 3,375,160 that are incorporated herein by reference for these teachings.

Depending on the mode of application, and hence the form of the gastropodicidal composition that is used, the gastropodicidal composition may contain anywhere from essentially no adjuvants up to about 99% adjuvants. Consequently the gastropodicide compositions employed in the method of this invention could contain anywhere from 1 to 100% of the active tetrachloroisophthalonitrile. Practically, however, it would be expected that the tetrachloroisophthalonitrile would normally constitute about 50 to 95% of the gastropodicide composition.

While the principal advantages herein described, of using tetrachloroisophthalonitrile in the eradication of gastropods transmitting schistosomiasis are maximized with gastropodicidal compositions containing only tetrachloroisophthalonitrile as the active ingredient, there may be instances when, to achieve certain results, it may be desirable or necessary to employ gastropodicide compositions containing one or more other types of gastropodical compounds. The proportion of such other gastropodicides to tetrachloroisophthalonitrile may vary widely depending upon the composition and activity of the other gastropodicides employed and the results that are desired. Generally, however, the tetrachloroisophthalonitrile should constitute at least 10% by weight and preferably 50% or more of the active ingredients in such combination gastropodicide compositions, if it is desired to retain to a significant extent the improved characteristics and advantages of the invention.

In applying the gastropodicide compositions containing tetrachloroisophthalonitrile in the field, different modes of applications may be employed depending on the results desired and the physical condition and chemical properties of the snail's environment as hereinbefore described. Generally, when rapid kills of adult snails are desired, the aquatic habitat typically may be dosed with a quantity of the gastropodicide composition that will provide about 10 to 20 p.p.m. of the active tetrachloroisophthalonitrile. For immature snails, about 5 to 10 p.p.m. and for the snail's eggs, about 0.5 to 1 p.p.m. will effect rapid kills. When slower toxicity is acceptable then, typically, as little as about 1 to 5 p.p.m. active material can be used to kill adult snails, about 0.5 to 1 p.p.m. to kill young snails, and 0.05 to 0.2 to kill or prevent the hatching of the snail's eggs. As will be apparent to those skilled in this art, higher or lower concentrations may be used or be required, depending upon the field conditions encountered and the results to be achieved, than these typical quantities that have been delineated only for the purpose of illustration and as a guideline for initial testing purposes.

The application of the tetrachloroisophthalonitrile gastropodicide to the snail's habitat may be intermittent or continuous and may employ any of the application methods utilized to dispense insecticides and fungicides. The many ramifications dictating the time, quantity, and method of applying gastropodicides to the habitats of schistosome snail vectors are well known and documented, as shown for example in the World Health Organization's 1965 monograph "Snail Control in the Prevention of Bilharziasis" and the article "Molluscicide Screening and Evaluation," supra, which are incorporated herein by reference for these teachings.

In the case of the Oncomelania amphibious snail species that are endemic to the Orient, the tetrachloroisophthalonitrile gastropodicide composition is most effectively and efficiently utilized by dosing the aquatic habitat that the newly hatched snails of the species inhabit during the first two to three weeks after hatching.

After that these species of snails spend most of time out of water necessitating spreading the gastropodicide either as a dry powder or as liquid dispersion over a much larger area of land where it is not as effective.

Illustrative of a gastropodical composition that may be used for in-the-field eradication of the schistosomiasis vector gastropod is the following dry-blended, water-wettable composition.

| Ingredient: | Parts by weight |
| --- | --- |
| Tetrachloroisophthalonitrile (ground to an average particle size of 2 micron maximum) | 75.0 |
| Sodium alkyl naphthalene sulfonate | 2.5 |
| Sodium lignon sulfonate | 1.5 |
| Kaolin clay | 21.0 |

This composition may either be broadcast into the snail habitat as a powder or it may be first dispersed in water and then applied as an aqueous dispersion.

Because of the inert nature and low water solubility of the tetrachloroisophthalonitrile, employed in the practice of this invention, mankind has been provided with a new long-lasting means to combat the scourge of schistosomiasis. Because of this, the need for the frequent applications of gastropodicide that characterize many presently used materials is obviated and costs thereby reduced. Further, because of the low phytotoxic and mammalian toxicity characteristics of tetrachloroisophthalonitrile, this invention provides a method of gastropod control that can be used even by illiterate and poorly trained personnel without fear of human poisoning and without impairment to other aquatic life that often may be needed as a food source. Finally, because of the effectiveness of tetrachloroisophthalonitrile against snail eggs and schistosome cercariae at extremely low concentrations, schistosomiasis may be controlled even after the chemical's concentration in the snail's habitat is no longer sufficient to effectively kill the immature or mature schistosome snail vectors.

Besides eradicating snail vectors of schistosomiasis, tetrachloroisophthalonitrile may be used to eradicate the gastropod vectors of other kinds of parasitic flukes or trematodes that inflict man and animals. In particular, tetrachloroisophthalonitrile may be employed in the chemical control of the snail intermediate hosts of lung flukes, liver flukes (such as those of the Fascilolidal family) and intestinal flukes utilizing the methods and teachings herein described for the eradication of the schistosome carrying snails. Illustrative of these other types of flukes and intermediate snail hosts that may be controlled by the method of this invention is the disclosure contained in chapter 14 of "Introduction to Parasiteology"—10th edition, by Chandler and Reed that is incorporated herein by reference. When tetrachloroisophthalonitrile is employed for the eradication of these other kinds of parasitic fluke carriers in accordance with the method of this invention it exhibits generally the same advantages that characterize its use against the schistosome gastropod vector and therefore is a particularly useful new weapon in man's battle against parasitic diseases of both man and animals.

What is claimed is:

1. A method of controlling the gastropod vector of a parasitic fluke of man or animals which comprises exposing the gastropod to a gastropodicidal amount of tetrachloroisophthalonitrile.

2. The method of claim 1 wherein the gastropod is in an aquatic habitat.

3. The method of claim 1 wherein the tetrachloroisophthalonitrile has an average particle size of 5 microns or less.

4. The method of claim 1 wherein the tetrachloroisophthalonitrile has an average particle size of 2 microns or less.

5. The method of claim 1 wherein the gastropod is a vector of a schistosome fluke.

6. The method of claim 1 wherein the gastropod is a vector of a Fasiolidae fluke.

7. A method of controlling the gastropod vector of a parasitic fluke of man or animals which comprises exposing the eggs of the gastropod to an amount of tetrachloroisophthalonitrile sufficient to prevent the hatching of the gastropod eggs.

8. The method of claim 7 wherein the gastropod eggs are in an aquatic habitat.

9. The method of claim 7 wherein the tetrachloroisophthalonitrile has an average particle size of 5 microns or less.

10. The method of claim 7 wherein the tetrachloroisophthalonitrile has an average particle size of 2 microns or less.

11. The method of claim 7 wherein the gastropod is a vector of a schistosome fluke.

12. The method of claim 7 wherein the gastropod is a vector of a Fasiolidae fluke.

References Cited
UNITED STATES PATENTS 3,331,735    7/1967    Battershell et al. ____ 424—304

ALBERT T. MEYER, Primary Examiner

L. SCHENKMAN, Assistant Examiner

U.S. Cl. X.R.

424—DIG. 12